United States Patent Office 2,748,002
Patented May 29, 1956

2,748,002

MANUFACTURE OF STABILIZED BEER

Eric Kneen, Milwaukee, Wis., assignor of two-thirds to The Kurth Malting Company, Milwaukee, Wis., a corporation of Wisconsin, and one-third to Wisconsin Malting Company, Milwaukee, Wis., a corporation of Wisconsin No Drawing. Application October 22, 1951,
Serial No. 252,571

13 Claims. (Cl. 99—48)

This invention relates to manufacture of stabilized beer; and it comprises a method of reducing or eliminating the gushing of beer wherein a small amount of ethylenediamine tetra acetic acid or one of its non-toxic alkali or alkaline earth metal salts is added to the beer as a stabilizing compound at any point during its manufacture prior to the bottling operation in quantity to produce from about 5 to 250 p. p. m. of the acid or salt in the final product, whereby gushing is substantially prevented and oxidative stability enhanced. The invention also includes the more specific process of adding the acid or salt to the malt or a portion thereof which is used in the brewing operation before it is kilned, followed by adding the so-treated malt to the mash used in the brewing operation in proportions required to produce an estimated content of stabilizing compound in the final beer amounting to from about 5 to 250 p. p. m. The invention further includes, as a new product, a kilned malt impregnated with one of said stabilizing compounds in quantity sufficient to produce a concentration in the finished beer ranging from about 5 to 250 p. p. m., as well as the finished beer produced by the processes described containing the stabilizer dissolved therein; all as more fully hereinafter set forth and as claimed.

The primary object of the present invention is to control or eliminate the tendency of beer to "gush." The "gushing" of beer is a condition frequently found in commercial beers. All beer is supersaturated with carbon dioxide gas. This is normally "bound" so tightly in the beer that even when the bottle, or other container, is opened at high beer temperatures (up to 100° F.) the release of carbon dioxide is slow and gradual. In the case of gushing beer, in contrast, the excess carbon dioxide above saturation level is released within a matter of seconds. This suddenly released carbon dioxide gushes from the bottle carrying the beer with it. Depending upon the "gushing" properties of the beer and upon the temperature, the loss of beer may amount to a few milliliters or in extreme cases up to two-thirds of the contents of the bottle may be lost. The higher the temperature at which the bottle is opened, the greater the loss.

A secondary object of the present invention is to increase the oxidative stability of beer. All beers contain a small amount of oxygen, and when stored at room temperature for any considerable period of time, most beers acquire an "oxidized flavor." Such beers also have a tendency to become cloudy. Beers vary considerably as to their tendency to acquire these unfavorable characteristics, i. e. they vary widely in their oxidative stability.

The gushing of beer has represented a problem to the art for as long as beers have been bottled. Many attempts have been made to control gushing, and a number of theories have been advanced as to its cause. In spite of these prior endeavors, however, no well recognized methods of controlling gushing have been recognized or adopted by the art. The problem is still empirical.

It has now been discovered that mere traces of any of the non-toxic alkali or alkaline earth metal salts of ethylenediamine tetra acetic acid or of the acid itself are capable of preventing or greatly reducing the gushing of beer. Surprisingly, it has also been found that the addition of these compounds likewise has an important effect in increasing the oxidative stability of the treated beer.

It has further been discovered that ethylenediamine tetra acetic acid and its salts are not destroyed or at least that their effectiveness in reducing gushing is not destroyed by the brewing operations. This makes it possible to add these compounds at any convenient point of the manufacturing process. For example, they may be added to the beer after filtration and just before bottling, to the malt before or after it is kilned, to the brewing water, to the mash, or to the kettle with the hops. Adding it to the finished beer is more economical, but it is somewhat more convenient to add it to the malt.

Malt treated with ethylenediamine tetra acetic acid or with one of its alkaline metal salts forms a valuable commercial product and can be employed by the brewery for controlling gushing. A treated malt can be brewed straight, or it can be mixed with an untreated malt in predetermined proportions completely to control the gushing at all seasons and with different brews, since any brewery may produce beers which vary greatly in gushing properties. Some of these require more treatment than others. The oxidative stability of the beers is increased inherently by the treatment.

While all of the alkali metal and alkaline earth metal salts of ethylenediamine tetra acetic acid, as well as the acid itself, have been found to be equally effective in reducing the gushing properties of beers, it is evident, of course, that the compound used must be non-toxic and preferably physiologically inert. Only a slight solubility in water is required, since the compounds are used in minute quantities. For these reasons, the sodium and calcium salts and ethylenediamine tetra acetic acid represent the preferred stabilizing compounds. But the corresponding lithium, potassium, and magnesium compounds are operative. Most of the experimental work has been conducted with the sodium salts of ethylenediamine tetra acetic acid, and the data thus obtained illustrate the results obtainable with the other compounds mentioned.

The invention can be explained in greater detail by reference to the following specific examples which represent practical operating embodiments of the present process.

EXAMPLE 1

In this example, a number of commercial cellar beers received from different breweries having difficulties from gushing were treated with different amounts of the disodium salt of ethylenediamine tetra acetic acid. In each case the beer was filtered, carbonated, bottled (into 12 oz. bottles), and then tested for gushing with and without the stabilizing treatment. The following tables contain a summary of the results obtained:

*Beers from brewery "A"*

| Cellar Beer No. | P. p. m. Salt Added | Gushing | Beer Loss Upon Opening Bottle at 86° F. |
|---|---|---|---|
| | | | ml. |
| 2 | 0 | active | 88 |
| 2 | 50 | quiet | 0 |
| 28 | 0 | violent | 82 |
| 28 | 50 | quiet | 0 |
| 12 | 0 | active | 65 |
| 12 | 50 | tendency | 0 |
| 12 | 100 | quiet | 0 |
| 9 | 0 | violent | 113 |
| 9 | 100 | quiet | 0 |
| 7 | 0 | active | 60 |
| 7 | 50 | quiet | 0 |
| 24 | 0 | active | 80 |
| 24 | 50 | quiet | 0 |
| 16 | 0 | active | 80 |
| 16 | 50 | quiet | 0 |
| 20 | 0 | active | 90 |
| 20 | 50 | quiet | 0 |

*Beers from brewery "B"*

| P. p. m. Salt Added | Gushing | Beer Loss at 86° F. |
|---|---|---|
| | | ml. |
| 0 | active | 64 |
| 5 | quiet | 0 |
| 25 | quiet | 0 |
| 50 | quiet | 0 |

*Beer from brewery "C"*

| P. p. m. Salt Added | Gushing | Beer Loss at 86° F. |
|---|---|---|
| | | ml. |
| 0 | very violent | 187 |
| 25 | slightly active | 9 |
| 250 | tendency | 0 |

It is evident from the results collected in the above tables that the addition of the di-sodium salt of ethylenediamine tetra acetic acid in amounts varying from about 5 to 250 p. p. m., depending upon the violence of the gushing, was effective in quieting beers from three breweries all of which were experiencing gushing troubles with commercial bottlings of these same beers when untreated.

EXAMPLE 2

Further experimental work establishes that the anion, i. e. the ethylenediamine tetra acetic part of the salt is the effective agent in reducing gushing and that the accompanying metal cation is relatively unimportant.

The di-sodium and di-potassium salts of ethylenediamine tetra acetic acid were made in the laboratory and tested. Mono-magnesium and mono-calcium salts of the acid were also prepared and tested with the following results:

*Beer from brewery "C"*

| Salt Added | P. p. m. Salt Added | Gushing | Beer Loss at 86° F. |
|---|---|---|---|
| | | | ml. |
| None | | violent | 150 |
| Di-Sodium | 100 | quiet | 0 |
| Di-Potassium | 100 | quiet | 0 |
| Mono-Calcium | 100 | quiet | 0 |
| Mono-Magnesium | 100 | quiet | 0 |

These and other tests have demonstrated that any of the non-toxic alkali and alkaline earth metal salts of ethylenediamine tetra acetic acid which are at least slightly soluble in water are operative in the process. While it has been impossible to detect any appreciable difference between salts of differing basicity, it is usually preferred to employ the di-basic salts, that is the di-sodium or mono-calcium salts of ethylenediamine tetra acetic acid.

EXAMPLE 3

In a commercial run in brewery A, 70 barrels of commercial cellar beer was run into a separate tank and treated with the di-sodium salt of ethylenediamine tetra acetic acid in the amount of 55 parts per million of the beer. This beer was then carbonated, bottled off commercially, pasteurized, and treated in identical fashion with a duplicate run which was untreated. The bottling was in quart bottles.

Immediately after the bottles were packed into cases, several were open at 75° F. Bottles of the untreated beer gushed violently and lost an average of 240 ml. per bottle, whereas the treated beer had only a slight tendency for wildness with no beer loss. A day later the untreated beer showed a loss averaging 320 ml. per bottle, while the treated beer again showed no loss.

It should be noted that in the above tests the quantity of salt added was approximately only 1.5 pounds per 100 barrels of beer—a normal supplement rate for brewery additions, for chill-proofing compounds, for example. These treatments caused no detectible change in the flavor or other properties of the beer, such as color, foam, or aroma. It has been found that additions of ethylenediamine tetra acetic acid or one of its sodium salts in amounts ranging up to from about 0.5 to 5 pounds per 100 barrels of beer, the quantity depending upon the severity of the gushing condition, will successfully eliminate the problem of gushing. A specific example using other compounds of ethylenediamine tetra acetic acid follows:

EXAMPLE 4

In these tests, five samples of the same mash were subjected to different treatments in which 100 p. p. m. of ethylenediamine tetra acetic acid and three of its sodium salts were added to separate batches, one batch being used as the control. The results are collected in the following table:

| Addition to Mash | Results |
|---|---|
| none | wild, 68 ml. beer loss. |
| 100 p. p. m. acid | tendency only, no loss. |
| 100 p. p. m. di-sodium salt | Do. |
| 100 p. p. m. tri-sodium salt | Do. |
| 100 p. p. m. tetra-sodium salt | Do. |

All four of the sodium salts of ethylenediamine tetra acetic acid as well as the acid itself produce the same favorable results. Of the five, the di-sodium salt is preferred, and most of the tests have been made with this particular salt.

EXAMPLE 5

In this example, tests were made by adding 100 p. p. m. (based on the final beer) at different points of the manufacturing process. One batch which received no treatment, using a regular mash, produced a wild beer and a 100 ml. loss by gushing. Another batch receiving 100 p. p. m. of di-sodium ethylenediamine tetra acetic acid added directly to the mash produced a beer having a slight tendency to wildness but no loss by gushing. Still another batch, receiving 100 p. p. m. of di-sodium ethylenediamine tetra acetic acid added to the kettle with the hops, produced a beer having a slight tendency to wildness but no loss by gushing.

EXAMPLE 6

In a further series of tests, varying amounts of di-sodium ethylenediamine tetra acetic acid were added to the brewing water added to batches of mash with the following results:

| Addition | Results |
| --- | --- |
| 0 | violent, 158 ml. beer loss. |
| 50 p. p. m. | mild, 74 ml. beer loss. |
| 125 p. p. m. | tendency, no beer loss. |

EXAMPLE 7

In this example, malt was treated with di-sodium ethylenediamine tetra acetic acid and then used as a carrier to produce stabilization of beers. To incorporate the salt into the malt, a green malt was treated with a water solution of the disodium salt before the malt was kilned. This green malt was then allowed to rest for a period of two hours and was then kilned off in the customary fashion. The concentration of the salt added, in terms of the finished malt, was approximately 2 g. per 100 g. of the dry malt. The amount of salt present in the treated malt can be varied between the limits of from about 0.5 to 10 per cent by weight on the dry basis, the final product being used as a supplement to the regular malt in the mash.

In a series of tests, small portions of the malt treated as above and containing 2 per cent of the di-sodium salt were substituted for equivalent amounts of a regular malt in several brews. Control runs were made with the same percentages of the same green malt kilned off identically but without the stabilizer. The following results were obtained:

| Percent Regular Malt in Mash | Percent Special Malt in Mash Carrying Stabilizer | Percent Special Malt Not Carrying Stabilizer | P. p. m. of Stabilizer in Terms of Finished Beer | Gushing Activity of Finished Bottled Beer |
| --- | --- | --- | --- | --- |
| 99.0 | 0 | 1.0 | 0 | mild, 76 ml. beer loss. |
| 95.0 | 0 | 5.0 | 0 | mild, 74 ml. beer loss. |
| 99.0 | 1.0 | 0 | 24 | mild, 49 ml. beer loss. |
| 95.0 | 5.0 | 0 | 120 | tendency, no beer loss. |

Tests indicate that a considerable portion of the efficiency of the stabilizing compound added to the malt is lost by adding it to the green malt, going through the kilning operations and going through the brewing operations, but this is counterbalanced by the greater convenience of being able to supply a treated malt which, when added in correct proportions to the regular malt, will stop gushing. Moreover, storage tests give indications that, when the stabilizing compound is added to the malt rather than to the finished beer, the latter is stabilized over somewhat longer periods. Thus, while the addition of the stabilizing compound to the finished beer does an excellent job of stabilizing the beer under all ordinary conditions, the procedure of adding the compound to the malt may be more advantageous due to greater convenience and to the fact that the so-stabilized beer is stabilized over somewhat longer periods. The latter is of special importance under certain abnormal or prolonged conditions of storage.

In another series of tests with the same treated malt but with different brewing materials, a control beer was produced which had violent gushing activity with 125 ml. beer loss. When 1.0 per cent of the regular malt used was substituted by the same proportion of treated malt in the mash, a beer was produced which in comparison showed mild activity and 26 ml. beer loss. These tests show that 24 p. p. m. of the di-sodium salt was not quite sufficient satisfactorily to control gushing of this beer. This introduces no problem since a standard "concentrate" malt can be made up and blended into the brewing materials at any desired appropriate level to eliminate the gushing present under normal operating conditions. It is likewise possible to use a concentrate (treated malt) having a higher percentage of the stabilizing agent in order to reduce the quantity of concentrate required and therefore the handling costs. The more serious the gushing, the higher the proportion of concentrate required in the mash.

EXAMPLE 8

In a commercial test of the method used in Example 7, the green malt resulting from 2400 bushels of barley was sprinkled with a solution containing 500 pounds of the di-sodium salt of ethylenediamine tetra acetic acid and the malt allowed to rest at cool temperatures for 12 hours before going to the kiln. The malt was kilned off in the normal fashion for brewers malt. Calculations showed that 6.4 per cent of this malt incorporated in a malt blend would provide approximately 40 p. p. m. of stabilizer in the finished beer, assuming no losses during processing. Two brews were made, one without the special malt and the other containing 10 per cent of the treated malt based on the total malt used. Theoretically, this should have supplied 62 p. p. m. of the stabilizing salt to the final beer. The control beer made without the treated malt was violently active with 132 ml. loss per bottle, whereas the beer made from the mash containing the treated malt varied from a slight tendency to gush to a 10 ml. beer loss with different bottles.

Other tests indicated that 15 per cent of the treated malt added to the mash produced adequate stabilization in the beers produced.

EXAMPLE 9

In the course of the experimental work, it was noted that beers treated with the new stabilizing agents remained phenomenally clear when the bottles were left to stand on the shelf for prolonged periods of time. Untreated beers tended to become very hazy under the same conditions. To test these observations, tests were made using a Coleman nephelometer to measure the increase of haziness of several test beers under accelerated oxidation. In the case of one beer to which 25 p. p. m. of ethylenediamine tetra acetic acid were added, the nephelometer reading was 20 after standing for a period of 4 days at room temperatures, whereas the control beer had a reading of 350. Another beer having the same addition of stabilizing agent had a reading of 18 after standing for 3 days, in comparison with a control reading of 105.

Similar tests were made on beers which were brewed from mashes to which a small proportion of a special malt had been stabilized by the addition thereto of ethylenediamine tetra acetic acid (di-sodium salt). In the case of one beer prepared in this manner and having a theoretical concentration of 40 p. p. m. of the salt (calculated as in Example 8), the nephelometer reading was 55 after standing for 4 days at room temperatures. A sample of the same beer having a theoretical content of 80 p. p. m. of the salt gave a reading of 20 in the same test. These values should be compared with the control sample having a reading of 113.

In still another test, a different beer having a theoretical content of 160 p. p. m. of the di-sodium salt gave a reading of 13 after standing for 4 days at room temperatures, whereas the control had a reading of 255. Numerous other tests furnished similar results. In all of these tests the beers containing added ethylenediamine tetra acetic acid or its salts remained clear or substantially so to the eyesight for the period of the tests, whereas the control samples ranged from hazy to very hazy.

Commercial tests confirmed these results. These tests show that the present process produces a substantial increase in the oxidative stability of beer as well as reducing or eliminating gushing.

"Green malt" as used in the foregoing specification and in the appended claims is defined as grain in any stage of controlled germination before its growth and enzymatic activities are terminated by final kilning temperatures.

While the more important embodiments of this process have been disclosed in the foregoing, it is obvious, of course, that various modifications can be made in the specific procedures which have been described without departing from the purview of this invention. As clearly indicated in the specific examples, ethylenediamine tetra acetic acid or its various non-toxic alkali and alkaline earth metal salts can be added to the beer for stabilization purposes at any convenient point in its manufacture prior to the actual bottling operation. The required addition can be made in any convenient manner and to any of the materials entering the process. If a chill-proofing compound is added, for example, the acid or one of its salts can be added along with this. The acid or its salt can be added in the form of an aqueous solution or as a dry powder, provided that the latter is eventually dissolved. Other modifications of this invention will be immediately evident to those skilled in this art.

What is claimed is:

1. In the stabilization of beer, the process which comprises mixing a stabilizing compound, selected from a class consisting of ethylenediamine tetra acetic acid and its non-toxic alkali and alkaline earth metal salts, with a green malt, kilning the malt to form a special malt impregnated with the stabilizing compound, adding a sufficient quantity of the special malt to the mash used in brewing to produce an estimated content of stabilizing compound in the finished beer amounting to from about 5 to 250 p. p. m., and producing a beer from the mash.

2. The process of claim 1 wherein the special malt contains from about 0.5 to 10 per cent by weight of the stabilizing compound and this is added to the mash along with regular malt in the proportions required to produce in the final beer a calculated concentration of stabilizing compound ranging from about 5 to 250 p. p. m.

3. As a new product, a kilned malt impregnated with an aqueous solution of a stabilizing compound selected from a class consisting of ethylenediamine tetra acetic acid and its non-toxic alkali and alkaline earth metal salts.

4. As a new product, a kilned malt impregnated with a stabilizing compound selected from a class consisting of ethylenediamine tetra acetic acid and its non-toxic alkali and alkaline earth metal salts, the quantity of stabilizing compound present in the impregnated malt being from about 0.5 to 15 per cent by weight.

5. In the preparation of a treated malt, adapted for use in brewing stabilized malt beverages, the process comprising impregnating a green malt with an aqueous solution of a stabilizing compound selected from a class consisting of ethylenediamine tetra acetic acid and its non-toxic alkali and alkaline earth metal salts, and then kilning the impregnated malt.

6. The process of claim 5 wherein the stabilizing compound is ethylenediamine tetra acetic acid.

7. The process of claim 5 wherein the stabilizing compound is the di-sodium salt of ethylenediamine tetra acetic acid.

8. The process of claim 5 wherein the stabilizing compound is the tri-sodium salt of ethylenediamine tetra acetic acid.

9. The process of claim 5 wherein the stabilizing compound is the tetra-sodium salt of ethylenediamine tetra acetic acid.

10. The process of claim 5 wherein the stabilizing compound is the mono-calcium salt of ethylenediamine tetra acetic acid.

11. In the preparation of a treated malt, adapted for use in brewing stabilized malt beverages, the process comprising treating a green malt with a stabilizing compound selected from a class consisting of ethylenediamine tetra acetic acid and its non-toxic alkali and alkaline earth metal salts, and then kilning the thus treated malt.

12. The process of claim 11 wherein the quantity of stabilizing compound added is from about 0.5 to 15 per cent by weight.

13. A malt product for use in brewing stabilized malt beverages comprising a kilned malt impregnated while green with an aqueous solution of a stabilizing compound selected from a class consisting of ethylenediamine tetra acetic acid and its non-toxic alkali and alkaline earth metal salts, the kilned malt containing from about 0.5 to 15 percent by weight of the stabilizing compound.

References Cited in the file of this patent

UNITED STATES PATENTS

| | | |
|---|---|---|
| 2,105,701 | Ramage | Jan. 18, 1938 |
| 2,348,818 | Curme | Sept. 18, 1945 |
| 2,428,353 | Bersworth | Oct. 7, 1947 |
| 2,461,519 | Bersworth | Feb. 15, 1949 |
| 2,500,019 | Bersworth | Mar. 7, 1950 |

OTHER REFERENCES

Technical Bulletin No. 1 of the Bersworth Chemical Co., Framington, Mass. Copyright Jan. 14, 1949, date as obtained from the Library of Congress, pages 1 to 5, 7 and 22.